US011655185B2

(12) United States Patent
Messerly et al.

(10) Patent No.: US 11,655,185 B2
(45) Date of Patent: May 23, 2023

(54) COATED OPTICAL FIBER AND METHOD OF MAKING SAME

(71) Applicant: Lawrence Livermore National Security, LLC, Livermore, CA (US)

(72) Inventors: Michael Messerly, Danville, CA (US); Nicholas Calta, Oakland, CA (US); Selim Elhadj, Livermore, CA (US); Andrew Lange, Livermore, CA (US); Cody Wren Mart, Livermore, CA (US); Robert Mellors, Livermore, CA (US); Nick Schenkel, Livermore, CA (US); Charles Xiao Yu, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 78 days.

(21) Appl. No.: 16/839,281

(22) Filed: Apr. 3, 2020

(65) Prior Publication Data

US 2020/0354269 A1 Nov. 12, 2020

Related U.S. Application Data

(60) Provisional application No. 62/843,758, filed on May 6, 2019.

(51) Int. Cl.
*C03B 37/03* (2006.01)
*C03C 25/106* (2018.01)
(Continued)

(52) U.S. Cl.
CPC ........ *C03C 25/1063* (2018.01); *C03B 37/032* (2013.01); *C03B 37/15* (2013.01); *C03C 25/18* (2013.01)

(58) Field of Classification Search
CPC .............. C03B 37/032; C03B 37/0158; C03C 25/1063
See application file for complete search history.

(56) References Cited

U.S. PATENT DOCUMENTS 3,540,870 A * 11/1970 Ching ................... C03B 37/029
65/529
3,791,172 A * 2/1974 Manfre ................. H01B 3/082
72/46
(Continued)

FOREIGN PATENT DOCUMENTS

CN 1097066 A * 1/1995 ............. C03C 25/12
JP 2009122229 A 6/2009
(Continued)

OTHER PUBLICATIONS

Bakku, S. K., 2015, Fracture characterization from seismic measurements in a borehole: Ph.D. thesis, Massachusetts Institute of Technology.
(Continued)

*Primary Examiner* — Cynthia Szewczyk
(74) *Attorney, Agent, or Firm* — Harness, Dickey & Pierce, P.L.C.

(57) ABSTRACT

A method is disclosed of making a coated optical fiber. The method may involve drawing a preform through a furnace to create a fiber having a desired diameter and cross sectional shape. The fiber is then drawn through a slurry, wherein the slurry includes elements including at least one of metallic elements, alloy elements or dielectric elements, and the slurry wets an outer surface of the fiber. As the fiber is drawn through the slurry, it is then drawn through a forming die to impart a wet coating having a desired thickness on an outer surface of the fiber. The wet fiber is then drawn through an oven or ovens configured to heat the wet coating sufficiently
(Continued)

to produce a consolidated surface coating on the fiber as the fiber exits the oven or ovens.

22 Claims, 2 Drawing Sheets

(51) Int. Cl.
    *C03B 37/15*     (2006.01)
    *C03C 25/18*     (2006.01)

(56) References Cited

U.S. PATENT DOCUMENTS

| | | | |
|---|---|---|---|
| 4,610,708 A | 9/1986 | Sarhangi et al. | |
| 4,824,455 A * | 4/1989 | Rand | C03B 37/027 427/163.2 |
| 7,905,114 B1 | 3/2011 | Horne et al. | |
| 2003/0180017 A1 | 9/2003 | Hayano et al. | |
| 2019/0249034 A1 * | 8/2019 | Bookbinder | C03C 25/106 |

FOREIGN PATENT DOCUMENTS

| | | |
|---|---|---|
| JP | 2009-251376 A | 10/2009 |
| JP | 2012-133391 A | 7/2012 |

OTHER PUBLICATIONS

Demkowicz-Dobrzahski, R., M. Jarzyna, and J. Kolodyhski, 2018, Quantum limits in optical interferometry, arXiv:1405.7703v3 [quant-ph] Aug. 16, 2018.

Dowling, J. P. and K. P. Aeshadreesan, 2018. Quantum optical technologies for metrology, sensing and imaging, https://arxiv.org/pdf/1412.7578.pdf.

Fu, P., Settgast, R. R., Johnson, S. M., Walsh, W. D. C., Morris, J. P., and Ryerson, F. J.: GEOS: User Tutorials, LLNL-TR-665515, (2014), 94 pages.

James, S. R. et al., 2017, Fracture detection and imaging through relative seismic velocity changes using distributed acoustic sensing and ambient seismic noise. The Leading Edge 36, 12, 1009-1017, https://doi.Org/10.1190/tle36121009.1.

Jin, G. and B. Roy, 2017, Hydraulic-fracture geometry characterization using low-frequency DAS signal. The Leading Edge, 36(12), 975-980. https://doi.Org/10.1190/tle36120975.1.

Karrenbach, M. et al. 2017, DAS Microseismic monitoring and integration with strain measurements in hydraulic fracture, URTeC: 2670716, DOI 10.15530/urtec-2017-2670716.

Mateeva, A et al., 2014, Distributed acoustic sensing for reservoir monitoring with vertical seismic profiling. Geophysical Prospecting, (2014), 62, 679-692.

Patterson, J. R. et al., 2017, Geothermal reservoir characterization using distributed temperature sensing at Brady Geothermal Field, Nevada, Leading Edge 36, 12, 1024al-1024a7 https://doi.org/10.1190/tle36121024al.

Petty, S. et al., 2013, Improving geothermal project economics with multi-zone stimulation: results from the Newberry Volcano EGS demonstration, Proc., 38th Workshop on Geothermal Reservoir Engineering, Stanford University, Stanford, CA, Feb. 11-13, 2013, SGP-TR-198.

Settgast, R. R., Fu, P., Walsh, S. D. C, White, J. A., Annavaraou, C., and Ryerson, F. J.:A fully coupled method for massively parallel simulation of hydraulically driven fractures in 3-dimensions, Int. J. Numer. Anal. Meth. Geomech., 41, (2017), 627-653. doi: 10.1002/nag.2557.

Sherman, C, Mellors, R., Morris, J., and Ryerson, R.: Geomechanical Modeling of Distributed Fiber-Optic Sensor Measurements. Interpretation, 7, (2019), 1-7. doi: 10.1190/INT-2018-0063.1.

Webster, P. et al., 2013, Micro-seismic detection using distributed acoustic sensing. SEG Tech. Prog. Exp. Abst. 2013: pp. 2459-2463., https://doi.Org/10.1190/segam2013-0182.1.

LIGO Scientific Collaboration, 2013, Enhanced sensitivity of the LIGO gravitational wave detector by using squeezed states of light, Nature Photonics, doi: 10.1038/nphoton.2013.177.

Palit, S. et al., 2012, A multi-modality fiber optic sensing cable for monitoring enhanced geothermal systems, Proc., 37th Work, on Geo. Res. Eng. Stanford, CA, 2012SGP-TR-194.

Reinsch, T. et al., 2016, Distributed Acoustic Sensing Technology in a Magmatic Geothermal Field—First Results from a Survey in Iceland, Geophysical Research Abstracts, 18, EGU2016-16670, EGU General Assembly 2016.

International Search Report and Written Opinion regarding International Application No. PCT/US2020/030092 dated Nov. 5, 2020.

Communication and Extended Search Report of corresponding European Patent Application No. 20802700.3 dated Dec. 13, 2022, 7 pages.

* cited by examiner

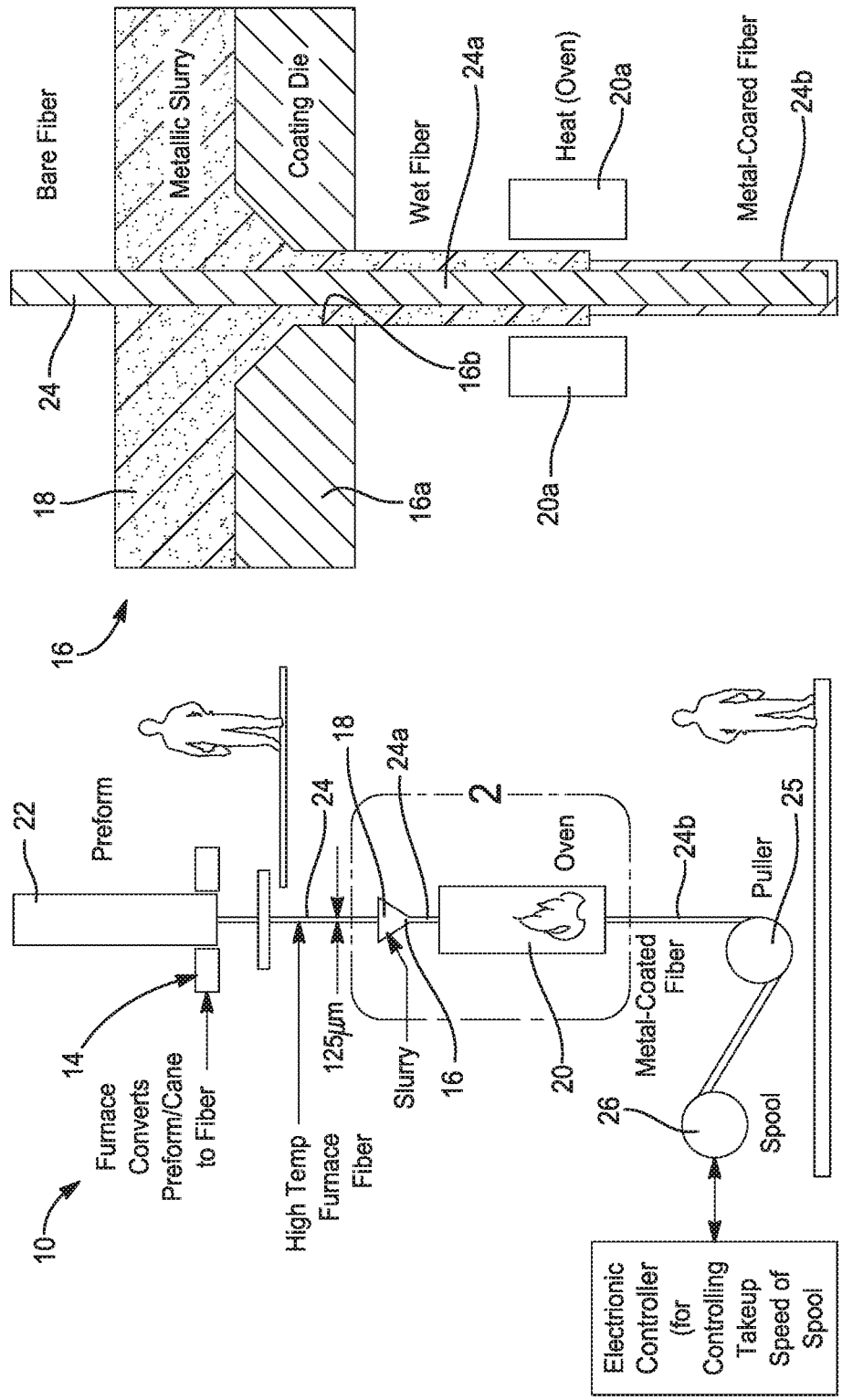

COATED OPTICAL FIBER AND METHOD OF MAKING SAME

CROSS-REFERENCE TO RELATED APPLICATIONS

This application claims the benefit and priority of U.S. Provisional Application No. 62/843,758, filed May 6, 2019. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to optical fibers, and more particularly to an optical fiber and a method of making same which has a desired coating thereon, which significantly increases a desired characteristic, for example durability and/or ability to withstand high temperatures and harsh environments, without negatively impacting its ability to transmit optical signals.

BACKGROUND

The statements in this section merely provide background information related to the present disclosure and may not constitute prior art.

Successful geothermal energy production requires several major factors: subsurface heat, adequate permeability to allow extraction of the heat, and proximity to electrical markets. While temperatures increase with depth in the subsurface, subsurface permeability varies greatly, and areas with sufficient permeability to allow economical heat extraction are relatively rare.

Enhanced Geothermal Systems (EGS) are geothermal systems where the subsurface permeability is artificially enhanced to allow for economic production from previously 'hot dry rock'. EGS solves the problem of permeability and allows greater flexibility in location, thereby ensuring an additional clean and low-impact domestic energy source for the United States, and retaining technical leadership in this field. An exciting opportunity is the potential for high-temperature (greater than 374° C., or 'super-critical') EGS, which will tap high-temperature reservoirs, and which has the potential to yield up to 50 MW per well, which greatly increases potential efficiencies.

Optimized EGS production requires imaging of the engineered subsurface fractures system and fluid flow. The advent of distributed sensing has provided unprecedented images of borehole temperature distribution (DTS) and allows imaging of fractures and associated micro-seismicity using distributed acoustic sensing (DAS). DAS uses optical fibers in cables to measure subtle strain signals within the well and, as the fibers are typically embedded outside the casing, do not significantly interfere with well operations. Yet the fibers provide a clear source of useful data, both for micro-seismicity and strain induced by fractures. This type of imaging is widely used in the petroleum industry and would be ideal for efficient EGS.

Unfortunately, several challenges exist with the use of optical fibers with EGS. First, the high-temperatures and corrosive, often acidic, conditions in geothermal wells require special fiber coatings along with low attenuation for high resolution imaging. Metal coated fibers largely overcome these challenges, and though they are today commercially available, their lengths are typically limited to less than one-hundred meters because current manufacturing methods are difficult to apply over longer lengths. Such present day metal coated fibers also can induce high signal attenuation, which decreases the sensitivity of distributed fiber measurements.

Optical fibers are composed of silica glass (core and cladding) surrounded by a coating for mechanical protection, and then embedded in a cable. The core and cladding control the photonic properties of the fiber, for example, single or multiple mode, polarization, and other factors. Silica glass is extremely resistant to high temperature (up to 800° C.) but is susceptible to hydrogen darkening. Hydrogen darkening is caused by diffusion of hydrogen into the fiber and increases transmission losses at specific wavelengths with time, and increases with temperature. The use of pure silica (e.g., non-doped) improves resistance to hydrogen darkening. The choice of coating can also affect the rate of hydrogen darkening, which is a significant concern in hot geothermal wells.

The silica fiber requires a coating to improve the mechanical strength, otherwise the fiber will be susceptible to surface damage which will greatly weaken the fiber. Coatings for telecom fiber are typically polymer based, but polymer based coatings generally have poor temperature resistance and are suitable only for temperatures below about 60° C., when such temperatures applied for many days. Polyimide coatings show better resistance, generally up to ~250° C. and ~300° C. for varying durations, but tend to be thin and need to be handled carefully. At higher temperatures, for example above 300° C., metal coatings are sometimes used. The metals are often aluminum (~400° C., forms oxide that may weaken fiber), copper (~300° C. but suffers from corrosion at higher temperatures), or gold (~700° C., expensive and may not adhere well). Other materials such as platinum (>400° C.) and tin (200° C.) have also been attempted.

Commercial distributed temperature sensing (DTS) fibers for steam injection into heavy petroleum reservoirs are available that are rated up to 300° C. Reinsch, Thomas, et al. "Distributed Acoustic Sensing Technology in a Magmatic Geothermal Field—First Results from a Survey in Iceland." *EGU General Assembly Conference Abstracts*, Vol. 18. (2016) developed a custom fiber that combined polyimide with an additional carbon coating and was tested in a geothermal well that reached temperatures up to 280° C. at the well head. Overall, performance was satisfactory but fiber degradation, as indicated by OTDR attenuation measurements, increased with time. This was attributed to the effect of the temperature and thermal/mechanical effects. The increased optical attenuation caused errors in the DTS measurements (DAS was not tested).

Palit, S., et al. "A multi-modal fiber optic sensing cable for monitoring enhanced geothermal systems", Proc., 37th Work, on Geo. Res. Eng. Stanford, Calif., 2012SGP-TR-194 (2012) physically tested both polyimide and aluminum coated fibers and found significant variations in time to failure for various commercial fibers. The effect of hydrogen darkening was reduced by using a pure silica core and a variety of coatings, including polyimide and aluminum.

Metal coatings, while resistant to high temperatures, are problematic in several ways, as they require challenging manufacturing operations, and metal coatings can affect the optical fiber in different ways. One common method of manufacture is to draw the fiber through a liquid metal near the melting point of the metal and coat the fiber. While this manufacturing technique sounds straightforward, it requires careful control of the viscosity, and hence temperature, of the metal. Electrolytic and electroless plating are manufacturing techniques which have also been used. Robust manufacturing is essential as fiber failure will lead to a loss of sensing capability, and depending on deployment setting within the well, may not be possible to remedy, once the fiber is emplaced.

For most metal the primary difficulty is that glass and metal differ greatly in thermal expansion coefficient. This characteristic can lead to problems during manufacture as well in the field deployment. For example, if the metal coating is not perfectly symmetric about the fiber, the differential expansion of the materials may cause microbends in the fiber, leading to high signal attenuation. This may be a factor in measuring weak Rayleigh-scattered signals from kilometers of fiber, as is necessary for current distributed fiber optic acoustic sensing. It is also known that Polyimide-coated fibers will degrade at high temperatures and become more rigid; thereby inducing micro-bending and higher attenuation. Metal coated fibers may display the opposite behavior; at low temperatures rigidity is high with correspondingly high losses, but beyond 200° C. the attenuation tends to decrease.

Finally, the thickness and elastic properties of the coating will change the strain response of the fiber. All these factors including manufacturing complexity, robustness, coating properties, and strain effect, as well as the dynamic range of the optical sensing unit, must be considered in designing an optimal fiber.

From the foregoing, it will be appreciated that low cost, robust metal-coated fibers would enable important measurements to be made within boreholes, and would be compatible with existing commercial interrogator units used on the surface. Some additional requirements are needed, such as suitable cabling (e.g., steel) but a satisfactory construction for the fiber is the challenging part. A process which is able to successfully create a metal coated fiber, where even high-melting point metals such as titanium could be applied uniformly to the exterior of the fiber, would have significant commercial applicability and value, and would be particularly valuable in geothermal applications, as well as other applications outside the geothermal market.

SUMMARY

This section provides a general summary of the disclosure, and is not a comprehensive disclosure of its full scope or all of its features.

In one aspect the present disclosure relates to a method of making a coated fiber. The method may comprise drawing a preform through a furnace to create a fiber having a desired diameter and cross sectional shape. The method may further include continuing to draw the fiber through a slurry, wherein the slurry includes elements including at least one of metallic elements, alloy elements or dielectric elements, and the slurry wets an outer surface of the fiber. The method may further include drawing the fiber through a forming die which contains at least a portion of the slurry to impart a wet coating having a desired thickness on an outer surface of the fiber, to create a wet fiber. The method further may comprise continuing to draw the wet fiber into and through an oven configured to heat the wet coating sufficiently to produce a consolidated surface coating on the fiber as the fiber exits the oven.

In still another aspect the present disclosure relates to a method of making a coated fiber. The method may comprise initially drawing a preform through a furnace using a vertical draw tower to create a fiber having a desired diameter and a cross sectional shape. The method may further comprise continuing to draw the fiber through an aperture of a die element containing a slurry, the slurry containing at least one of metal elements or dielectric elements, and where the die element is disposed elevationally below the furnace such that the slurry coats the fiber with a portion of the slurry to form a wet coating on the fiber as the fiber passes through the aperture, thus creating a wet fiber, and the aperture is dimensioned such that the wet coating has a desired thickness. The method may further comprise continuing to draw the wet fiber into an oven disposed elevationally below the die element. The method may further comprise using the oven to evenly heat the wet fiber such that the wet coating is consolidated to form a consolidated surface on the fiber.

In still another aspect the present disclosure relates to a system for creating a metallic coated fiber. The system may comprise a vertically arranged draw tower having a furnace. The vertically arranged draw tower is configured to draw a preform through the furnace to create a fiber having a desired diameter and a cross sectional shape as the fiber leaves the furnace. The system may also include a funnel shaped die element having an aperture. The funnel shaped die element contains a slurry, with the slurry containing at least one of metal elements or dielectric elements. The funnel shaped die element is disposed elevationally below the furnace such that the slurry coats the fiber with a portion of the slurry to form a wet coating on the fiber as the fiber passes through the aperture, thus creating a wet fiber. The aperture may be dimensioned such that the wet coating has a desired thickness. The system may also include an oven which is disposed elevationally below the die element. The oven is configured to evenly heat the wet fiber such that the wet coating is consolidated to form a consolidated surface on the fiber.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1 is a high level block diagram of a system 10 in accordance with one embodiment of the present disclosure for manufacturing a metal coated optical fiber;

FIG. 2 is an enlarged, high level diagram illustrating the forming die and the oven, to better illustrate how a metal coating is applied to the optical fiber as it passes through these components;

DETAILED DESCRIPTION

Figures 3, 4:
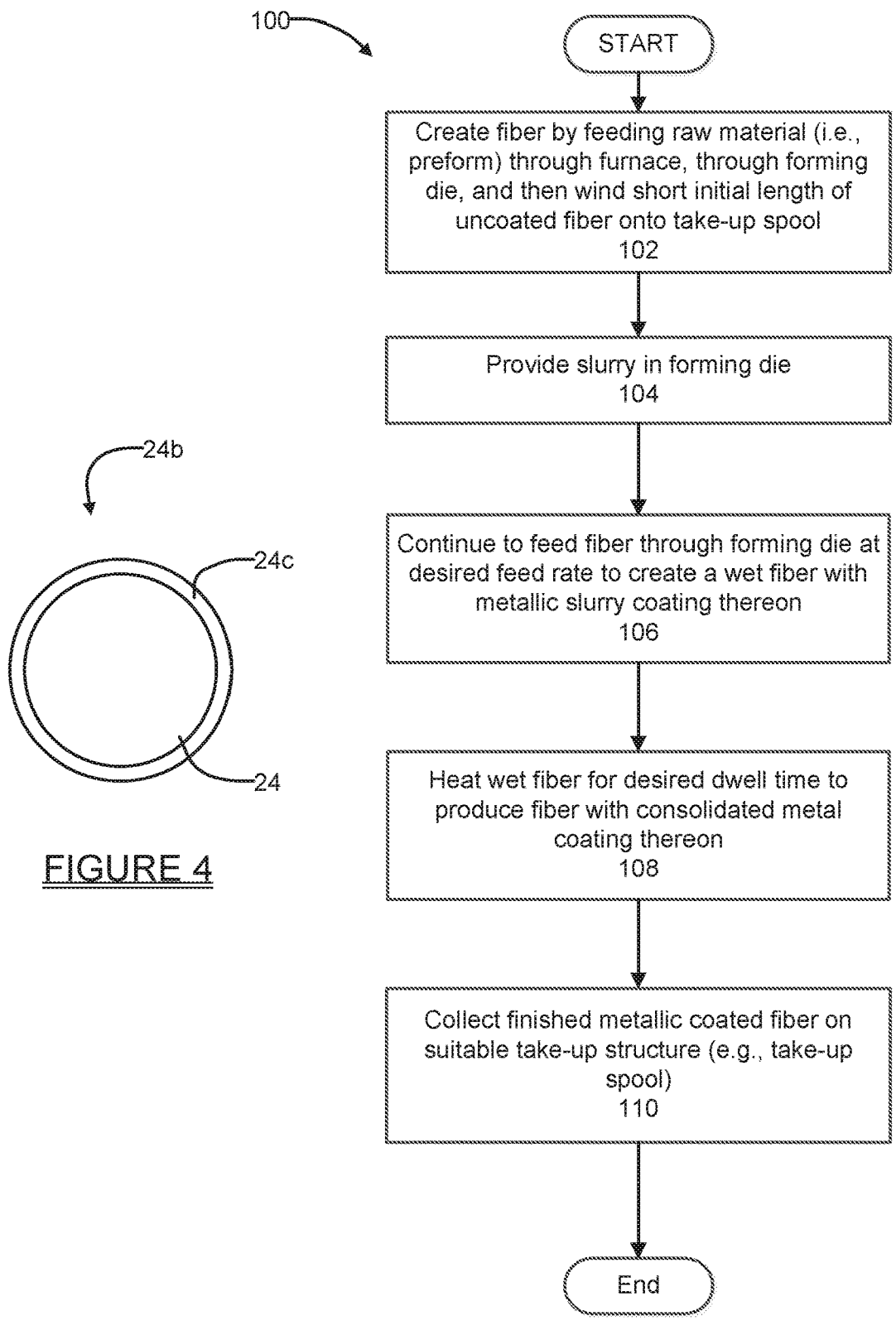
FIG. 3 is a high level flowchart setting forth various operations that may be performed using the system of FIG. 1 in creating a metal coated optical fiber.
FIG. 4 is a highly enlarged, simplified cross-sectional illustration of the metallic coated fiber illustrating the uniform metallic coating over the full circumference of the encased fiber.

Example embodiments will now be described more fully with reference to the accompanying drawings.

The present disclosure relates broadly to a fiber design and method of making an optical fiber which is capable of withstanding at least 300-400° C. temperatures for extended periods of time. The present disclosure achieves this objective through a new fiber construction and method of making same, which provides a 'fit-for-purpose' fiber well suited for high-temperature geothermal deployments, as well as deployments in other applications outside of geothermal applications. In summary, the present disclosure involves the application of a wet metallic slurry, consisting of metallic particles dissolved or suspended in a solution, to a long, continuous optical fiber as the fiber is drawn. The slurry-coated fiber then travels through a high temperature oven or furnace, which evaporates the solvent and melts the metallic particles into the thin, continuous coating.

Referring to FIG. 1, a fiber draw tower 10 is shown for constructing a metal coated fiber 12 in accordance with the present disclosure. The fiber draw tower 10 in this example has been constructed by the assignee of the present disclosure and forms a structure about 8.2 m in overall height. The draw tower 10 includes a top furnace 14, a forming die 16 which holds a slurry 18, and a mid-span oven or furnace 20. The top furnace 14 is able to produce extremely high temperatures (at least about 700° C., and in some applications about 2000° C. or higher) that may be used to melt glass preforms, such as preform 22 shown in simplified form in FIG. 1, into a glass fiber 24. The preforms in this example may be rods of telecon-grade fused silica, or preforms constructed by well-known methods, including stack-and-draw methods. In one implementation the preform 22 may have a diameter of about 1.0" (25.4 mm), but as will be appreciated this dimension may be varied as needed to suit the needs of a specific implementation.

At a lower level of the draw tower 10, as shown in FIG. 2, the oven 20 may include two or more separate oven units 20a that can reach temperatures of at least about 300° C., and in some embodiments at least about 700° C., which is sufficient to melt tin (232° C.) tin alloys and aluminum (660° C.). The heating elements contained within the oven units 20a may be arranged in a circle to provide even heat to the glass fiber 24 as it passes through the oven 20. The oven 20 may be constructed to provide even higher temperatures, for example a furnace in which a hollow graphite element is heated by flowing large electrical currents through it, and the specific temperature used will depend in large part on the composition of the metallic slurry 18 and the specific type of metallic coating being applied.

As shown in FIG. 2, the forming die 16 includes a die element 16a partially shaped like a funnel, and having a relatively small aperture 16b at a lower end thereof. The aperture 16b will determine the diameter of the slurry coating, and its size relative to the fiber 24 that it coats can be selected based on the viscosity of the slurry. The funnel shape of the die element 16a helps to channel the fiber 24 towards an axial center of the aperture 16b as it passes through the metallic slurry 18 so that a layer of uniform thickness of the metallic slurry 18 is applied to the fiber 24 as it exits the die element 16a. This produces a "wet" fiber 24a as the fiber 24 exits the forming die 16.

Advantageously, the present disclosure controls leakage of the slurry through the aperture 16b by selecting the diameter of the aperture, and by controlling the slurry's rheology. The slurry's rheology may be controlled by adjusting its temperature, and/or by adding chemical compounds to the slurry or by removing compounds from the slurry, or by modifying concentrations of the constituents of the slurry, which either increase or decrease its viscosity. The ability to adjust the rheology of the slurry is an important benefit of the present system and method. With previously existing fiber coating methods, it is difficult, if not impossible, to carefully control the molten metal's rheology. In some instances, it is believed that pre-existing fiber coating operations have suffered problems with gold dripping out of the bottom of the slurry funnel when coating fibers using a molten gold slurry. Obviously, leakage of slurry material containing expensive metals like gold is highly undesirable.

As the wet fiber 24a enters and passes through the oven 20, the oven units 20a heat the wet fiber, and the interior of the oven may be filled with an inert gas to prevent oxidation, or a reactive gas to promote desired characteristics of the metal coating, or an inert gas to enable the use of metals or dielectrics that may be pyrophoric. The heating evaporates the solvent portion of the metallic slurry 18 and consolidates (i.e., melts, fuses or joins) the metal particles in the metallic slurry into a continuous metal coating on the fiber 24. If more than one oven unit is used for the heating, then a first oven unit may be used which is at a temperature which is just hot enough to drive off solvents, and one or more following oven units may be used which is/are much hotter than the first oven unit, and which possibly has/have different ambient atmosphere(s), to melt pure metal, metal alloy, or dielectric particles together. This produces an even, fully coated fiber 24b having a diameter just slightly larger than the original diameter of the fiber 24. Typically, the thickness of the coating is roughly several microns to many tens of microns. In one example the coated fiber 24b has a diameter of 200 microns. However, as will be appreciated, the thickness of the metal or dielectric coating, as well as the thickness of the fiber 24, may be selected and/or controlled by selection of the aperture 16b dimension of the die element 16a so that the thickness of the coating meets the needs of a specific application.

At a lower level of the draw tower 10 a puller wheel structure 25 may be included along with a spool 26. The puller wheel structure 25 helps to redirect the finished, metal coated fiber 28 onto the spool 26 where it is wound for temporary storage. The spool 26 may be a motor driven component, wherein the motor (not shown) is controlled by a controller matched to the draw speed of the fiber 24 as it passed through the forming die 16 and the oven 20.

It will be appreciated that the draw tower 10 provides a significant advantage in coating fibers in that it enables virtually any length fiber to be coated with a metal, dielectric, or even with an alloy. This is in contrast to the use of conventional furnaces, which are constructed to encapsulate a limited length segment of fiber, which makes the dimension of the furnace a limiting factor in the overall length of the coated fiber being constructed. The vertical orientation of the draw tower 10 also helps to ensure that an even coating of metallic slurry 18 will be applied to the fiber 24, which may be difficult, or maybe even impossible, to ensure with a horizontally arranged furnace. Even further, the vertical orientation of the draw tower 10 enables two or more sections of ovens units 20a to be arranged vertically, one directly above the other, which can enable a longer dwell time for the wet fiber 24a to be exposed to heat, and thus enable even higher temperatures to be achieved in heat the wet fiber 24a. Different vertically arranged sections of the oven 20 may potentially be turned on or off using a suitable controller, depending on the specific composition of the slurry and/or the thickness of the metallic coating being applied, to tailor the temperature and/or dwell time that the wet fiber 24a spends exposed to heat from the oven units 20a, and without necessitating physical modification (e.g., removal or reconfiguration) of oven units 20a in the draw tower 10. Still further, different vertically arranged oven units 20a could be selected to provide different heating temperatures, in the event it is important to ramp up heating in a more gradual manner to the wet fiber 24a.

The teachings of the present disclosure are not restricted to the use of any specific type of metallic material in the metallic slurry 18. Any type of metal material or alloy, which is not pyrophoric, may be used. However, it is expected that various metals such as Cu, Ti, and Cr, or possibly even Au or Ni, or combinations of these alloys and other metals, may be especially desirable in helping to form the metallic slurry 18. Still further, it is possible that the metallic slurry 18 may be comprised of non-metallic material, as well as non-metallic and metallic materials. The metallic material may be provided as a powder or in granular form along with a suitable solvent to form the metallic slurry 18. In addition, slurries developed for so-called additive manufacturing applications, sometimes referred to as metal inks, may be used. Still further, in one embodiment the metallic material comprises gallium, and the metallic slurry 18 comprises liquid gallium. In this embodiment the liquid gallium, when heated using the oven 20, forms a gallium oxide coating ($Ga_2O_3$) as a consolidated surface coating.

While fibers 24 having a round cross-sectional shape are expected to be the most popular shape of fiber used to produce metallic coated fibers, the present disclosure is not limited to use with only cross-sectionally round fibers. It is possible that other cross-sectional fiber shapes (e.g., and without limitation, square, triangular, hexagonal, pentagonal, etc.) may be used as well to meet the needs of a specific application. This, of course, is likely to necessitate modifying the preform 22 and possibly the die element 16a of the forming die 16 to implement the desired cross-sectional shape.

Referring briefly to FIG. 3, a flowchart 100 is illustrated which sets forth one example of operations that may be performed in forming the finished, coated metal fiber 24b. Initially, it will be understood that a length of bare (i.e., uncoated) fiber 24 having a desired cross-sectional shape and diameter is initially created by drawing the preform 22 through the furnace 14, then through the forming die 16, and then winding a small length of the uncoated fiber 24 onto the take-up spool, as indicated at operation 102. At operation 104 the metallic slurry 18 is then deposited in the forming die 16. At operation 106, coating of the fiber 24 begins by continuing to draw the fiber 24 through the forming die 16, which is now filled with the metallic slurry 18, at a desired feed rate. This imparts a wet metallic coating on the outer surface of the fiber 24 to create the wet fiber 24a, where the metallic coating has a uniform, desired thickness. The desired feed rate may vary significantly depending on the composition of the metallic slurry 18, the thickness of metallic coating being formed on the fiber 24, the temperature of oven 20 and other factors, but in some instances the feed rate may be between about one meter/minute to several meters/seconds.

At operation 108 the oven 20 is used to heat the wet fiber 24a as it passes through the over for the desired dwell time, to produce the finished, coated fiber 24b having the consolidated metal coating thereon. At operation 110 the finished coated fiber 24 may be directed onto the take-up spool 26.

FIG. 4 shows a highly enlarged, not-to-scale, simplified representation of the finished, metallic coated fiber 24b. The fiber 24 is coated with a generally uniform thickness coating 24c around its full circumference to create the finished, metallic coated fiber 24b. Again, the metallic coated fiber 24b need not be circular; other shapes are readily possible.

While the metallic coated fibers 24b described herein, and the method of making same, are expected to be extremely useful for downhole oil field applications, where high temperature environments are present, the metallic coated fibers are also expected to find utility in other applications. Such other applications may include use as fibers for high power laser applications. In a laser application, the dielectric-coated fiber material may serve to confine light from pump diodes into a fiber. The metal coating is expected to enable the fiber to survive sustained high temperatures induced at high laser powers. These are but a few of the potential applications that the metallic coated fiber of the present disclosure may find utility in.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of making a coated fiber, comprising:
    drawing a preform through a furnace to create a fiber having a desired diameter and cross sectional shape;
    continuing to draw the fiber through a slurry, wherein the slurry includes a plurality of elements, the plurality of elements including at least one of metallic elements, alloy elements or dielectric elements, and the slurry wets an outer surface of the fiber;
    as the fiber is drawn through the slurry, drawing the fiber though a funnel-shaped forming die having an aperture at a lower end thereof, with a diameter of the aperture selected based on a viscosity of the slurry and a desired thickness of a wet coating to be imparted on an outer surface of the fiber, to create a wet fiber; and
    continuing to draw the wet fiber into and through an oven configured to heat the wet coating sufficiently to produce a consolidated surface coating on the fiber as the fiber exits the oven; and
    controlling a rheology of the slurry in part by controlling a temperature of the slurry as the fiber is drawn through the funnel-shaped forming die, and in part by at least one of:
        adding at least one chemical compound to the slurry; or
        subtracting at least one chemical compound from the slurry; or
        modifying a concentration of at least one constituent of the slurry; and
    wherein controlling the rheology of the slurry helps to control the viscosity of the slurry, to in turn control leakage of the slurry through the aperture while the fiber is being drawn through the aperture.

2. The method of claim 1, wherein the plurality of elements includes metal particles comprised of at least one of metal powder particles or granular metal particles.

3. The method of claim 1, wherein drawing the fiber through a slurry comprises using a vertically arranged draw tower to draw the fiber through the slurry.

4. The method of claim 1, wherein the plurality of elements comprises at least one of: a naturally occurring metal which is not pyrophoric.

5. The method of claim 4, wherein the slurry comprises a solvent which is evaporated during heating of the wet coating.

6. The method of claim 1, wherein the plurality of elements comprises metallic elements including at least one of copper (CU), chromium (Cr), Titanium (Ti), gold (Au) or nickel (Ni).

7. The method of claim 1, wherein the plurality of elements further comprise a dielectric, and the dielectric comprises magnesium fluoride ($MgF_2$).

8. The method of claim 1, wherein the elements comprise gallium, and the slurry comprises liquid gallium.

9. The method of claim 8, wherein the liquid gallium, when heated using the oven, forms the consolidated surface coating as a gallium oxide coating ($Ga_2O_3$).

10. The method of claim 1, wherein drawing the fiber through a slurry comprises drawing the fiber through a die element, wherein the die element holds a quantity of the slurry.

11. The method of claim 1, wherein drawing the fiber into and through an oven comprises drawing the fiber into and through an oven filled with at least one of:
    an inert gas to prevent oxidation;
    a reactive gas to promote a desired characteristic of the consolidated surface; or
    an inert gas to enable the use of metals or dielectrics that are pyrophoric.

12. The method of claim 1, wherein drawing the fiber into and through an oven comprises drawing the fiber into and through an oven formed by a plurality of spaced apart oven units such that at least one of:
    the fiber passes past each of the oven units and is evenly heated by the oven units; or
    the fiber passes past each of the oven units and is exposed to different temperatures by each oven unit, at least one of the different temperatures being sufficient to melt the elements.

13. The method of claim 12, wherein at least one of the oven units is operated to reach a temperature of at least 300 degrees C.

14. The method of claim 1, wherein drawing the preform through a furnace comprises drawing a telecom-grade fused silica rod through the furnace.

15. The method of claim 1, wherein the furnace produces a temperature of at least about 700 degrees C.

16. The method of claim 1, further comprising using a puller wheel structure having a spool, the spool receiving the fiber after the fiber exits the oven.

17. A method of making a coated fiber, comprising:
    drawing a preform through a furnace using a vertical draw tower to create a fiber having a desired diameter and a cross sectional shape;

continuing to draw the fiber through an aperture of a funnel-shaped die element containing a slurry, the slurry containing at least one of metal elements or dielectric elements, the die element disposed elevationally below the furnace such that the slurry coats the fiber with a portion of the slurry to form a wet coating on the fiber as the fiber passes through the aperture, thus creating a wet fiber, and the aperture being dimensioned such that the wet coating has a desired thickness;

controlling a rheology of the slurry by controlling a temperature of the slurry as the fiber is drawn through the funnel-shaped die element, wherein controlling the rheology of the slurry further includes at least one of:
adding at least one chemical compound to the slurry; or
subtracting at least one chemical compound from the slurry; or
modifying a concentration of at least one constituent of the slurry; and wherein controlling the rheology of the slurry helps to control a viscosity of the slurry, to in turn control leakage of the slurry through the aperture while the fiber is being drawn through the aperture;

continuing to draw the wet fiber into an oven disposed elevationally below the funnel-shaped die element;

using the oven to evenly heat the wet fiber such that the wet coating is consolidated to form a consolidated surface on the fiber; and further comprising using an inert gas within the oven to prevent oxidation.

18. The method of claim 17, wherein drawing a preform through the furnace comprises drawing a telecom-grade fused silica rod through the furnace.

19. The method of claim 17, wherein the at least one of metal elements or dielectric elements comprise naturally occurring metals which are not pyrophoric.

20. The method of claim 17, wherein the at least one of metal elements comprises at least one of copper, chromium, titanium, gold or nickel.

21. A system for creating a metallic coated fiber, comprising:
a vertically arranged draw tower having a furnace, the vertically arranged draw tower configured to draw a preform through the furnace to create a fiber having a desired diameter and a cross sectional shape as the fiber leaves the furnace;

a funnel shaped die element having an aperture at a lower end, the aperture having a diameter configured based on a desired thickness of a wet coating and a viscosity of a slurry being used to form a wet coating on the fiber, the funnel shaped die element containing the slurry, the slurry containing at least one of metal elements or dielectric elements, the funnel shaped die element disposed elevationally below the furnace such that the slurry coats the fiber with a portion of the slurry to form the wet coating on the fiber as the fiber passes through the aperture, and wherein a rheology of the slurry is controlled at least in part by controlling the temperature of the slurry to further control the viscosity to prevent leakage from the aperture, and in part by at least one of:

adding at least one chemical compound to the slurry; or subtracting at least one chemical compound from the slurry; or modifying a concentration of at least one constituent of the slurry; and an oven disposed elevationally below the die element, the oven configured to evenly heat the fiber such that the wet coating is consolidated to form a consolidated surface on the fiber.

22. A method of making a coated fiber, comprising:

drawing a preform through a furnace to create a fiber having a desired diameter and cross sectional shape;

continuing to draw the fiber through a slurry, wherein the slurry includes a plurality of elements, the plurality of elements including at least one of metallic elements, alloy elements or dielectric elements, and the slurry wets an outer surface of the fiber;

as the fiber is drawn through the slurry, drawing the fiber though a forming die to impart a wet coating having a desired thickness on an outer surface of the fiber, to create a wet fiber;

continuing to draw the wet fiber into and through an oven configured to heat the wet coating sufficiently to produce a consolidated surface coating on the fiber as the fiber exits the oven; and wherein the elements comprise metal elements, and wherein the metal elements comprise gallium, and the slurry comprises liquid gallium.

* * * * *